United States Patent
Childress et al.

(10) Patent No.: US 11,431,285 B2
(45) Date of Patent: Aug. 30, 2022

(54) DYNAMIC STABILIZER FOR SOLAR TRACKERS

(71) Applicant: COROSOLAR LLC, Phoenix, AZ (US)

(72) Inventors: Isaac Riley Joseph Childress, San Rafael, CA (US); Rob Ward, San Rafael, CA (US); Patrick Keelin, San Francisco, CA (US); Lauren Busby, San Francisco, CA (US); Michael Maulick, Palo Alto, CA (US)

(73) Assignee: Corosolar LLC, Phoenix, AZ (US)

( * ) Notice: Subject to any disclaimer, the term of this patent is extended or adjusted under 35 U.S.C. 154(b) by 0 days.

(21) Appl. No.: 15/644,543

(22) Filed: Jul. 7, 2017

(65) Prior Publication Data

US 2018/0013380 A1    Jan. 11, 2018

Related U.S. Application Data

(60) Provisional application No. 62/360,289, filed on Jul. 8, 2016.

(51) Int. Cl.
| | |
|---|---|
| *H02S 20/32* | (2014.01) |
| *F24S 30/458* | (2018.01) |
| *F16F 9/56* | (2006.01) |
| *F24S 40/80* | (2018.01) |
| *F24S 25/67* | (2018.01) |

(Continued)

(52) U.S. Cl.
CPC ............... *H02S 20/32* (2014.12); *F16F 9/56* (2013.01); *F24S 25/67* (2018.05); *F24S 30/425* (2018.05); *F24S 30/458* (2018.05); *F24S 40/85* (2018.05); *F24S 50/60* (2018.05); *F16F 9/19* (2013.01); *F24S 25/10* (2018.05); *F24S 2025/018* (2018.05); *F24S 2030/11* (2018.05); *F24S 2030/19* (2018.05); *Y02E 10/47* (2013.01)

(58) Field of Classification Search
CPC ..... H02S 20/32; F24S 2025/018; F24S 25/10; F24S 2030/19; F24S 2030/11; F24S 25/67; F24S 40/85; F24S 30/425; F24S 30/458; F16F 9/56; F16F 9/19
See application file for complete search history.

(56) References Cited

U.S. PATENT DOCUMENTS

| | | | |
|---|---|---|---|
| 4,264,145 A * | 4/1981 | Urruela ................. | F24S 30/452 359/846 |
| 6,068,930 A | 5/2000 | Shingleton | |

(Continued)

OTHER PUBLICATIONS

Bansbach Gas Springs Catalogue, Jul. 2010.

(Continued)

*Primary Examiner* — Uyen M Tran
(74) *Attorney, Agent, or Firm* — Snell & Wilmer L.L.P.

(57) ABSTRACT

A non-drive dynamic stabilizer includes a damper and an actuator. The dynamic stabilizer provides multiple states of support to a solar tracker structure. These states may include 1) flexible movement and/or damping during normal operation (i.e. tracking) and/or 2) rigid or locked, whereby the dynamic stabilizer acts as a restraint. The dynamic stabilizer is actuated by a control system according to the real-time demands on the structure. Sensors to provide input to the control system may include wind speed sensors, wind direction sensors, snow sensors, vibration sensors and/or displacement sensors.

21 Claims, 9 Drawing Sheets

(51) Int. Cl.
    *F24S 30/425*     (2018.01)
    *F24S 50/60*     (2018.01)
    *F16F 9/19*     (2006.01)
    *F24S 25/00*     (2018.01)
    *F24S 30/00*     (2018.01)
    *F24S 25/10*     (2018.01)

(56) References Cited

U.S. PATENT DOCUMENTS

| | | | | |
|---|---|---|---|---|
| 6,142,039 | A * | 11/2000 | Herring, Sr. | B67B 7/00 53/381.4 |
| 2003/0060320 | A1* | 3/2003 | Woodcock | F16H 3/145 475/230 |
| 2007/0074753 | A1* | 4/2007 | Altali | G01S 3/7861 136/243 |
| 2009/0314325 | A1* | 12/2009 | Borton | G02B 5/09 136/246 |
| 2010/0185333 | A1* | 7/2010 | Oosting | F24S 30/455 700/279 |
| 2012/0125401 | A1* | 5/2012 | DeVillier | F24S 50/20 136/246 |
| 2013/0009352 | A1* | 1/2013 | Hilpert | F16F 9/12 267/140.13 |
| 2016/0297278 | A1* | 10/2016 | Farjoud | B60G 17/08 |
| 2016/0329860 | A1* | 11/2016 | Kalus | F24S 30/425 |

OTHER PUBLICATIONS

Exosun, Exotrack HZ, Technical Datasheet.
Haydon Kerk Catalogue, 2016.
NEXTrackerSPT, Data Sheet, May 2015.
SunLink ViaSol Tracker, Data Sheet, Sep. 24, 2015.

* cited by examiner

DYNAMIC STABILIZER FOR SOLAR TRACKERS

This application claims the benefit of U.S. Provisional Application No. 62/360,289, filed Jul. 8, 2016, entitled LOCKING MECHANISM FOR SOLAR TRACKERS, the disclosure of which is herein incorporated by reference.

BACKGROUND OF THE INVENTION

1. Field of the Invention

The present invention relates to solar tracking systems, and more particularly, to a dynamic stabilizer system for resisting environmental forces acting on a solar tracking system.

2. Description of the Related Art

Solar trackers have moving and fixed parts. The fixed parts include the foundations and bearing assemblies. The moving parts include elements such as solar modules, torque tubes, levers, linkages, and other hardware. An actuator is required to move the moving parts. The actuator positions the solar modules so that they generate more electricity than a fixed-tilt system. During adverse environmental conditions, such as high winds, the actuator can be used to place the system into "stow," a position in which the solar tracker has the highest capacity to resist such forces and/or such forces are minimized. Each actuator typically moves more than one solar module to reduce the cost and number of potential failure points of the actuators. With such a design, however, the modules being moved can be a significant distance (e.g. 150 ft) from the actuator. Creating a large structure that moves easily yet is robust to environmental forces, especially wind, is a main consideration in the design of solar trackers.

Commonly deployed solar trackers can be classified into linked-row and single-row designs. A typical linked-row design is described by Shingleton (U.S. Pat. No. 6,058,930). A single actuator connected to a system of linkages positions multiple rows of solar modules (a solar tracker array). The linkages are fixed to the torque tubes of each row, and many solar modules are placed along the torque tube. The torque tube is named as such because in order to keep the panels in the desired position the torque tube must resist very significant torque caused by gravitational and wind loads acting at a distance from the linkage. Many linked row trackers use torque tubes, but some, such as the Exosun Exotrack HZ™ solar tracker, do not. However, not having a torque tube to efficiently transmit torque to the center of the row appears to limit the practical length of the row. Longer rows are generally desired because they reduce the number of row-to-row linkages in a given array size.

Single-row trackers such as the NEXTracker SPT™ utilize a single actuator per row. An electric slew drive at the center of each row positions a torque tube carrying approximately 80 solar modules. The rapid reduction in the cost of electronics has made such designs cost-effective. Regardless of the architecture, both single-row and linked-row trackers carry significant torque back to the actuator or linkage.

Long rows lead to some additional critical considerations. The structures are relatively flexible and dynamic effects must be considered. Many tracker manufacturers incorporate dampers into their tracker systems to prevent the rows from swaying wildly in the wind. The dampers modify the natural frequency of the system, with the intention of preventing dynamic amplification and resonance from causing damage to the system. Dampers, however, are of questionable use when designing for critical environmental events per generally accepted civil engineering standards, e.g. ASCE 7-10. Because dampers can move, they do not necessarily increase the rated or design static load capacity of the structure, nor do they necessarily increase the static stiffness of the structure.

SUMMARY OF THE INVENTION

In general, according to the present invention, a non-drive dynamic stabilizer includes a damper and an actuator. The dynamic stabilizer provides multiple states of support to a solar tracker structure. These states may include 1) flexible movement and/or fixed or variable damping during normal operation (i.e. tracking) and/or 2) rigid or locked, whereby the dynamic stabilizer acts as a restraint. The dynamic stabilizer serves to 1) redistribute the loads; 2) increase the stiffness and natural frequency of the structure; and 3) increase the structural capacity of the structure. The dynamic stabilizer is actuated by a control system according to the real-time demands on the structure.

Sensors to provide input to the control system may include wind speed sensors, wind direction sensors, snow sensors, vibration sensors and/or displacement sensors.

According to one embodiment of the invention, a dynamic stabilizer comprises a damper, and an actuator, wherein the actuator locks the damper to resist movement of the solar tracker system caused by environmental forces, and unlocks the damper to allow for normal operation. The damper may include a valve and a pin for actuating the valve.

According to an alternate embodiment of the present invention, a dynamic stabilizer comprises an enclosure, a locking damper, a lever, a rod having a first end attached to the locking damper and the enclosure, a push-type latch having a fixed portion mounted to the first end of the rod, and a moveable portion connected to the lever, and a linear actuator connected to the enclosure. The dynamic stabilizer may further include a limit switch attached to the enclosure.

Multiple modes of actuation between locked and unlocked positions are possible, including, but not limited to, a mechanical guide wire, a push-pull rod, or a remote activated linear actuator, each serving to selectively depress the pin of the locking damper. The exact construction of the dynamic stabilizer (damper and actuator combination) can be varied, as long as it provides the ability to lock and unlock, in order to provide support against environmental forces acting on the solar tracker.

According to another embodiment of the present invention, a solar tracker system comprises a plurality of foundation supports, a dynamic stabilizer attached to at least one of the plurality of foundation supports, each dynamic stabilizer comprising a damper comprising a valve and a pin, and an actuator connected to the pin to lock and unlock the damper by controlling the valve; and a plurality of solar panels rotatably attached to the foundation supports and to the dynamic stabilizers, wherein the actuator locks the damper to resist movement of the solar panels caused by environmental forces, and unlocks the damper to allow for normal operation. The system may further include one or more sensors to detect an environmental condition, and a control system to control the actuation of the dynamic stabilizers.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art. Any and all such modifications, equivalents and alternatives are intended to fall within the spirit and scope of the present invention.

In general, the present invention is a non-drive device that provides multiple states of support to a solar structure. These states may include 1) flexible movement and/or damping during normal operation (i.e. tracking) and/or 2) rigid or locked, whereby the dynamic stabilizer acts as a restraint. The dynamic stabilizer serves to 1) redistribute the loads; 2) increase the stiffness and natural frequency of the structure; and 3) increase the structural capacity of the structure. The dynamic stabilizer is actuated by a control system according to the real-time demands on the structure. Sensors to provide input to the system may include wind speed sensors, wind direction sensors, snow sensors, vibration sensors and/or displacement sensors.

Figure 1:
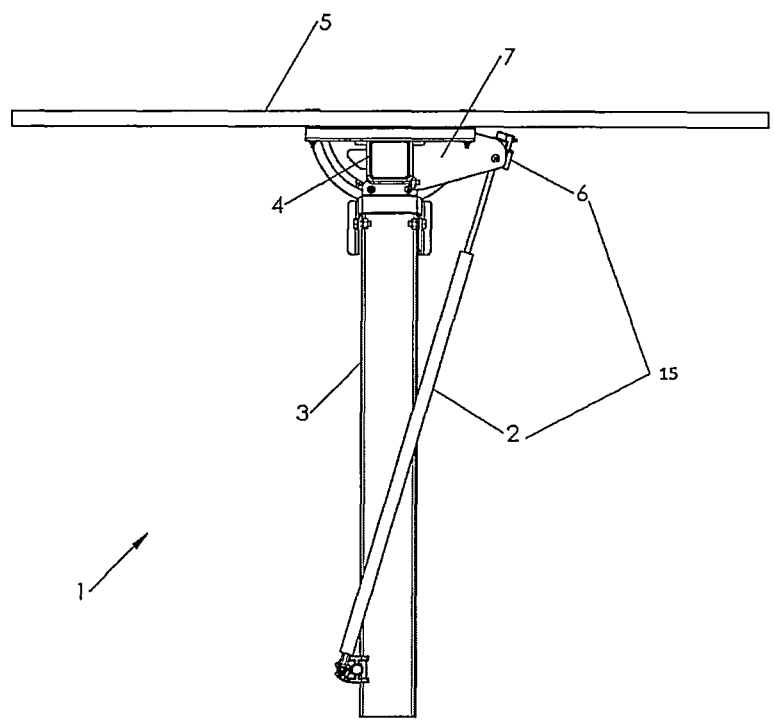
FIG. 1 is a frontal view of an example solar tracker equipped with one embodiment of the present invention.
Figure 2:
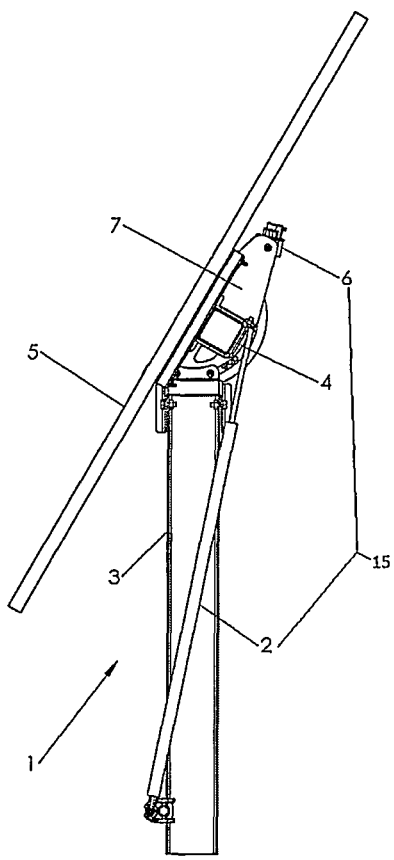
FIG. 2 is a frontal view of the solar tracker of FIG. 1 in a rotated position.

Referring to FIGS. 1-2 there is shown a solar tracker 1 employing a remote-activated dynamic stabilizer 15 connecting a foundation support 3 to a torque tube 4. As commanded by a tracker controller (not shown), the dynamic stabilizer 15 can be made flexible (unlocked with fixed or variable damping) or rigid (locked). The dynamic stabilizer 15 comprises a damper 2, such as the Bansbach Easylift™ Locking Damper, and an actuator 6. The damper 2 incorporates a valve within the damper body that regulates the flow of oil through the damper. A pin through the damper shaft actuates the valve. When the pin is depressed, the valve opens, allowing free movement of the damper. When the pin is released, the valve closes, locking the damper. Multiple modes of actuation between locked and unlocked positions are possible, including, but not limited to, a mechanical guide wire, a push-pull rod, or a remote activated linear actuator, each serving to selectively depress the pin of the locking damper. The exact construction of the dynamic stabilizer (damper and actuator combination) can be varied, as long as it provides the ability to lock and unlock, in order to provide support against environmental forces acting on the solar tracker.

FIG. 1 shows a solar tracker 1 equipped with the invention with solar collectors 5 oriented in a horizontal position; FIG. 2 shows how the assembly adjusts when solar collectors 5 are oriented in a rotated position. In the embodiment of FIG. 1 the dynamic stabilizer 15 may be locked by the actuator 6 when solar tracker 1 is positioned at any arbitrary rotation angle. The dynamic stabilizer 15 can also incorporate damping. When locked by the actuator 6, the dynamic stabilizer 15 acts as a rigid strut that transmits gravitational and environmental loads to the foundation support 3. In the absence of the device of the present invention, a significant portion of the loads would collectively add as torque along the torque tube 4 or row.

Figure 3:
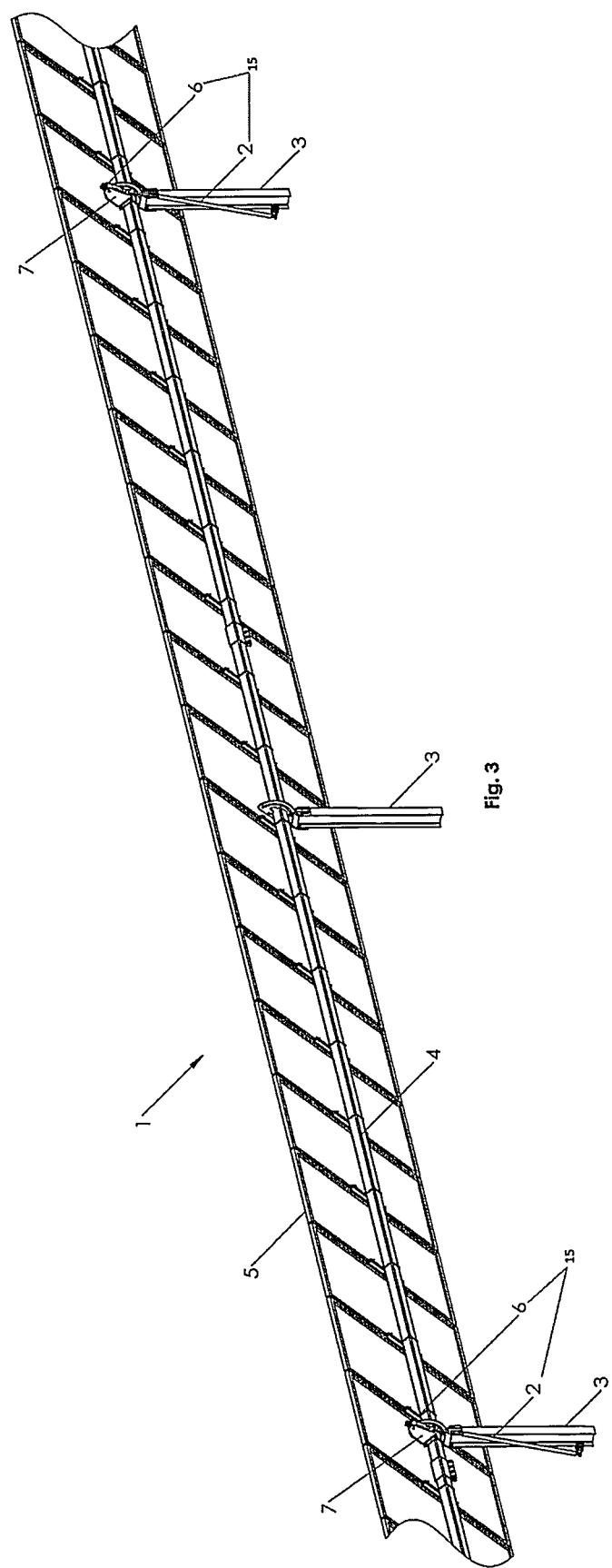
FIG. 3 is a perspective view of the solar tracker of FIG. 1 in a rotated position.

FIG. 3 illustrates the solar tracker 1 of FIGS. 1-2. Multiple dynamic stabilizers 15 are illustrated on multiple foundation supports 3. An arbitrary number of dynamic stabilizers 15 may be attached to the solar tracker enabling designs of systems that incorporate additional load paths from the source environmental forces (e.g. wind forces on the solar collectors 5) to the foundation supports 3.

Figure 4:
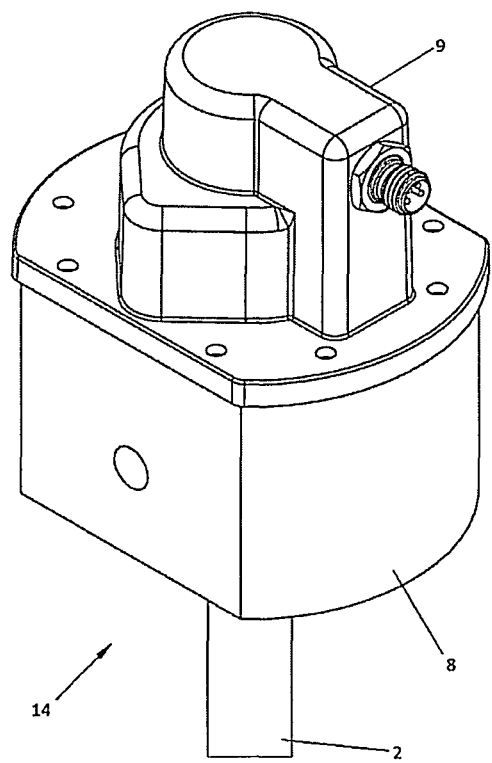
FIG. 4 is a detail view of the actuation mechanism of the embodiment of FIG. 1.
Figure 5:
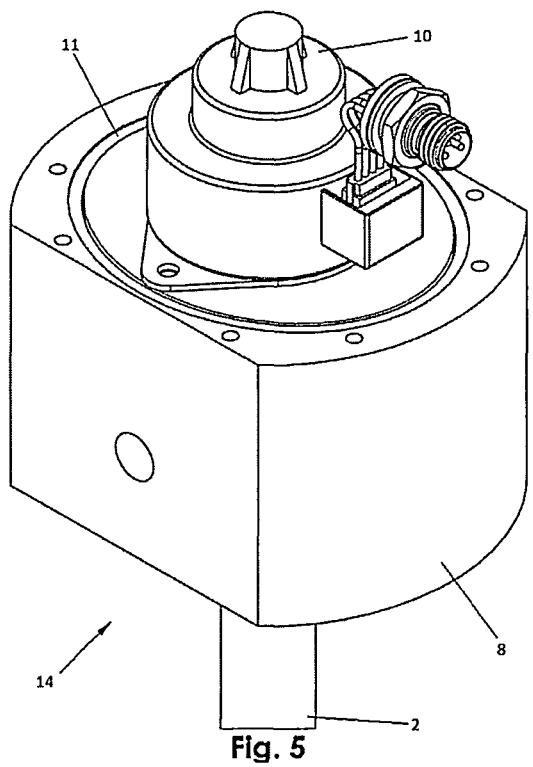
FIG. 5 is a detail internal view of the actuation mechanism of the embodiment of FIG. 1.
Figure 6:
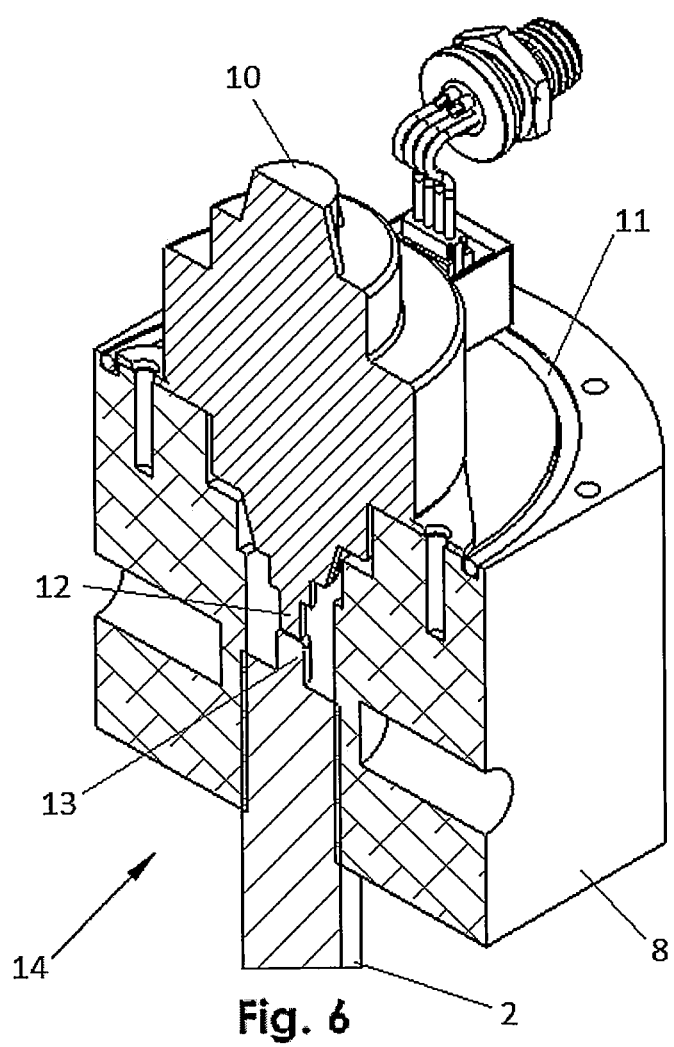
FIG. 6 is a detail internal section view of the actuation mechanism of the embodiment of FIG. 1.

FIGS. 4-6 illustrate the internal details of an actuator assembly 14 according to one possible embodiment of an actuator assembly 6 of FIGS. 1-3. A rod end 8 may be constructed of aluminum by machining. An enclosure 9 may be constructed of plastic by injection molding. The linear actuator 10 and O-Ring 11 are widely available components which may be produced of various materials by various manufacturing methods. As an example, the linear actuator 10 may be a Haydon Kerk/Ametek™ Can Stack Linear Actuator.

Referring again to FIGS. 4-6 there is shown a rod end 8 rigidly attached via screws to a locking damper 2, linear actuator 10, and enclosure 9. The O-Ring 11 rests in a channel feature of the rod end 8.

Still referring to FIG. 6, there is shown a cross-sectional view of the actuator assembly 14. When commanded by the tracker controller (not shown), the rod 12 of the linear actuator 10 depresses a pin 13 of the locking damper 2 to allow free movement of the damper. The rod 12 of the linear actuator 10 can be commanded by the tracker controller to retract and release the pin 13 of the locking damper 2 in order to lock the damper.

Figure 7:
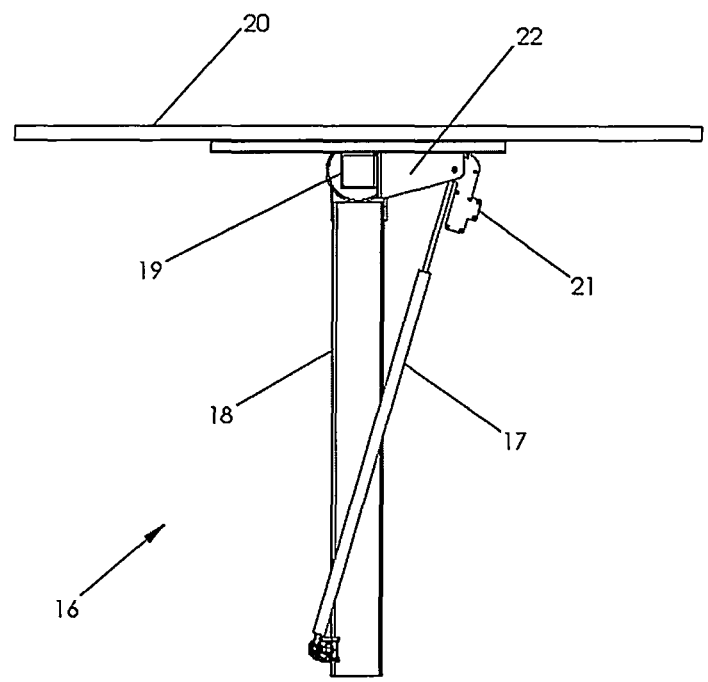
FIG. 7 is a frontal view of an example solar tracker equipped with one embodiment of the present invention.
Figure 8:
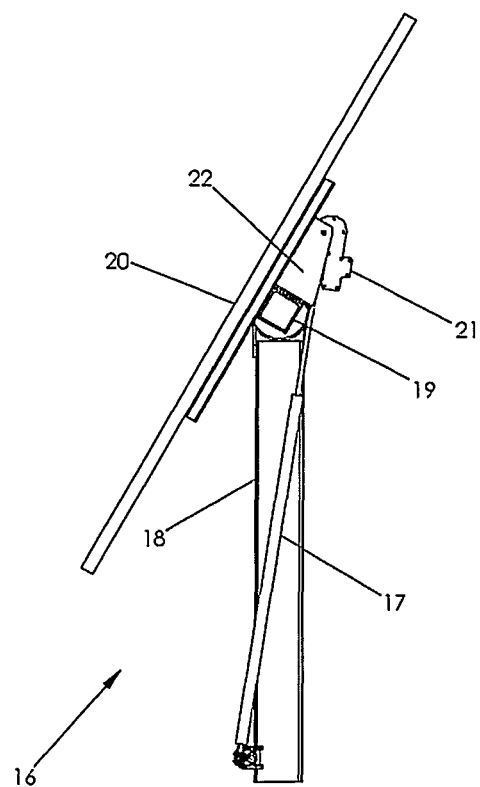
FIG. 8 is a frontal view of the solar tracker of FIG. 7 in a rotated position.

FIGS. 7-8 illustrate a solar tracker 1 employing a remote-activated locking damper 17 connecting a foundation 18 to a torque tube 19. As commanded by the tracker controller, the damper 17 can be made flexible (unlocked) or rigid (locked). The damper 17 itself may be of a conventional design, such as the Bansbach Easylift™ Locking Damper. The damper 17 incorporates a valve within the damper body that regulates the flow of oil through the damper. A pin through the damper shaft actuates the valve. When the pin is depressed, the valve opens, allowing free movement of the damper. When the pin is released, the valve closes, locking the damper. Multiple modes of actuation between locked and unlocked are possible, including, but not limited to, a mechanical guide wire, a push-pull rod, or a remote activated linear actuator, each serving to selectively depress the pin of the locking damper.

FIG. 7 shows a solar tracker 16 equipped with the invention with solar collectors 20 oriented in a horizontal position; FIG. 8 shows how the assembly adjusts when solar collectors 20 are oriented in a rotated position. In the embodiment of FIG. 7 the damper 17 may be locked by actuator 21 when solar tracker 16 is positioned at any arbitrary rotation angle. The damper 17 can also incorporate damping. When locked by actuator 21, the damper 17 acts as a rigid strut that transmits gravitational and environmental loads to the foundation 18. In the absence of the present invention, a significant portion of the loads would collectively add as torque along the torque tube 19 or row.

Figure 9:
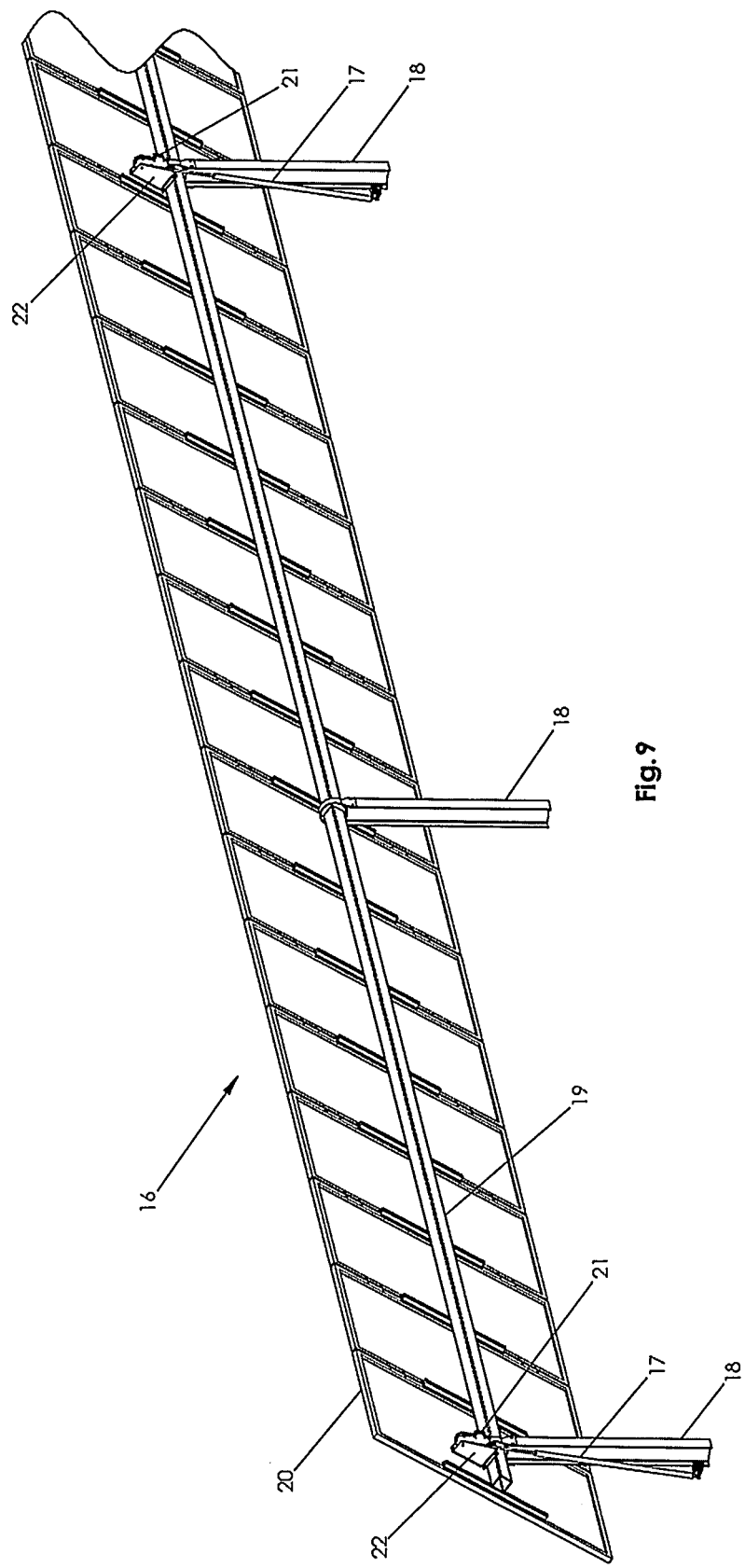
FIG. 9 is a perspective view of the solar tracker of FIG. 7 in a rotated position.

Referring to FIG. 9 there is shown the solar tracker 16 of FIGS. 7-8. Multiple locking dampers 17 and actuator assemblies 21 are illustrated on multiple foundations 18. An arbitrary number of assemblies of locking dampers 17 and actuator assemblies 21 may be attached to the solar tracker enabling design of the system to incorporate additional load paths from the source environmental forces (e.g. wind forces on the solar collectors 20) to the foundations 18.

Figure 10:
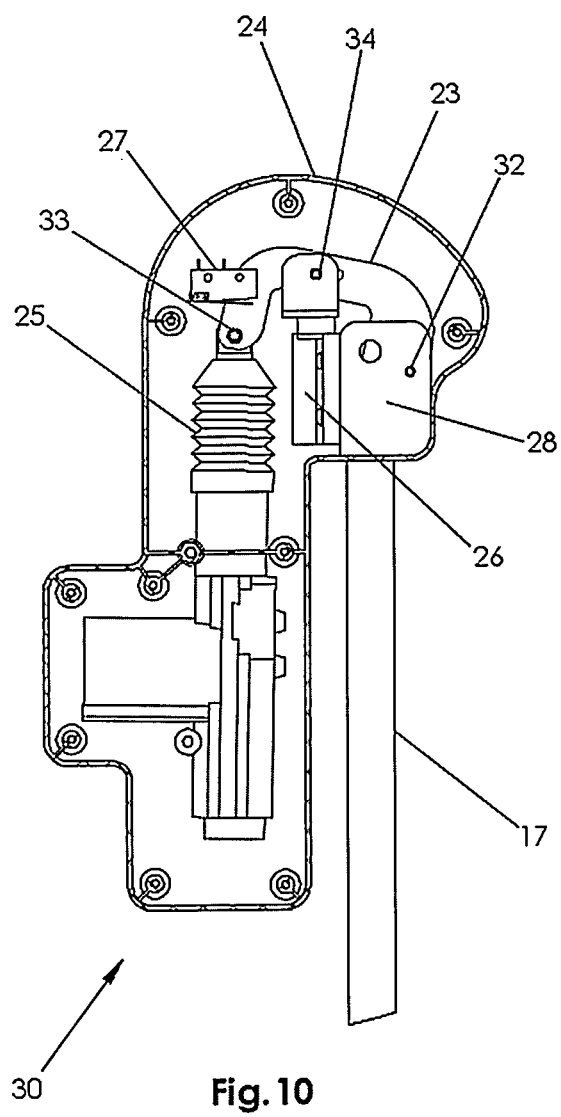
FIG. 10 is a detail view of the actuation mechanism of the embodiment of FIG. 7 in a locked position.
Figure 11:
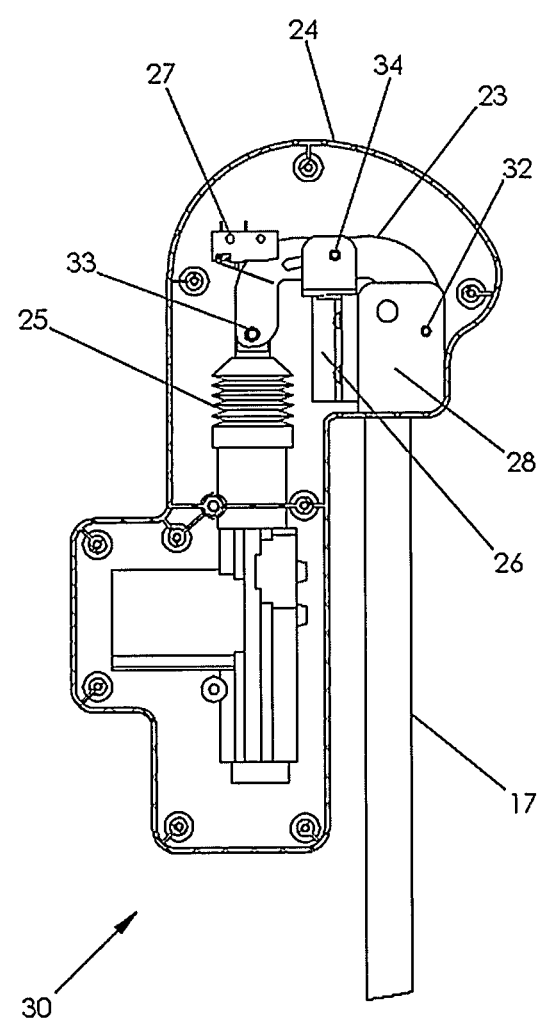
FIG. 11 is a detail view of the actuation mechanism of the embodiment of FIG. 7 in an unlocked position.
Figure 12:
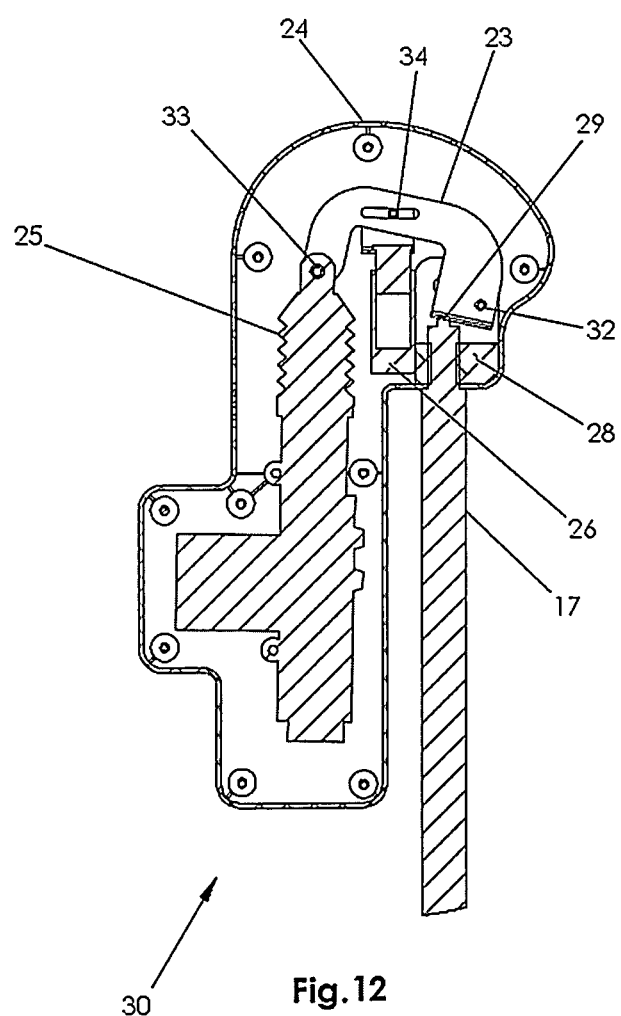
FIG. 12 is a detail view of the actuation mechanism of the embodiment of FIG. 7 in a locked position.

FIGS. 10-12 show the internal details of an alternative actuator assembly 30, which is one possible embodiment of actuator assembly 21 of FIGS. 7-9. A rod end 28 may be constructed of aluminum by machining. Lever 23 may be constructed of stainless steel by stamping. Enclosure 24 may be constructed of plastic by injection molding. Linear actuator 25, push-type latch 26, and limit switch 27 are generally available components which may be produced of various materials by various manufacturing methods.

Referring again to FIGS. 10-12, there is illustrated a rod end 28 rigidly attached to locking damper 17 and enclosure 24. The fixed portion of push-type latch 26 is rigidly mounted to rod end 28. The moveable portion of push-type latch 26 is pinned by pin 31 through a slot in lever 23. Pin 32 is affixed in rod end 28 and protrudes through a hole in lever 23. Linear actuator 25 is pinned by pin 33 to enclosure 24. Linear actuator 25 is pinned by pin 34 to lever 23. Optional limit switch 27 is rigidly attached to enclosure 24.

Still referring to FIGS. 10-12, the actuator assembly 30 is shown in various states. FIGS. 10 and 12 show actuator assembly 30 in a locked state. FIG. 11 shows actuator assembly 30 in an unlocked state. Pin 34 of FIG. 10 depresses optional limit switch 27 which may inform an electronic control system of a locked or unlocked state, depending on positioning of optional limit switch 27. FIG. 11 shows optional limit switch 27 disengaged from pin 34. Locking damper pin 29 shown in FIG. 12 is spring loaded and continually exerts a force on lever 23. To transition between locked and unlocked states of actuator assembly 30, linear actuator 25 in the state of FIG. 10 is made to retract and lever 23 is caused to rotate counterclockwise about pin 32 and linear actuator 25 is caused to rotate counterclockwise about pin 33.

Furthermore, the locking damper pin 29 and push-type latch 26 are depressed. When the state of actuator assembly 30 transitions from the locked state of FIG. 10 to the unlocked state of FIG. 11, push-type latch 26 latches in the state of FIG. 11 and prevents clockwise rotational motion of lever 23 about pin 32. The latching of push-type latch 26 in the state of FIG. 11 allows actuator assembly 30 to remain in the state illustrated in FIG. 11 without continuous force exertion of linear actuator 25. To transition from the unlocked state of FIG. 11 to the locked state of FIG. 10, the linear actuator 25 is made to momentarily retract causing push-type latch 26 to depress and unlatch. The spring force of locking damper pin 29 then returns all components of actuator assembly 30 to the state of FIG. 10.

Figure 13:
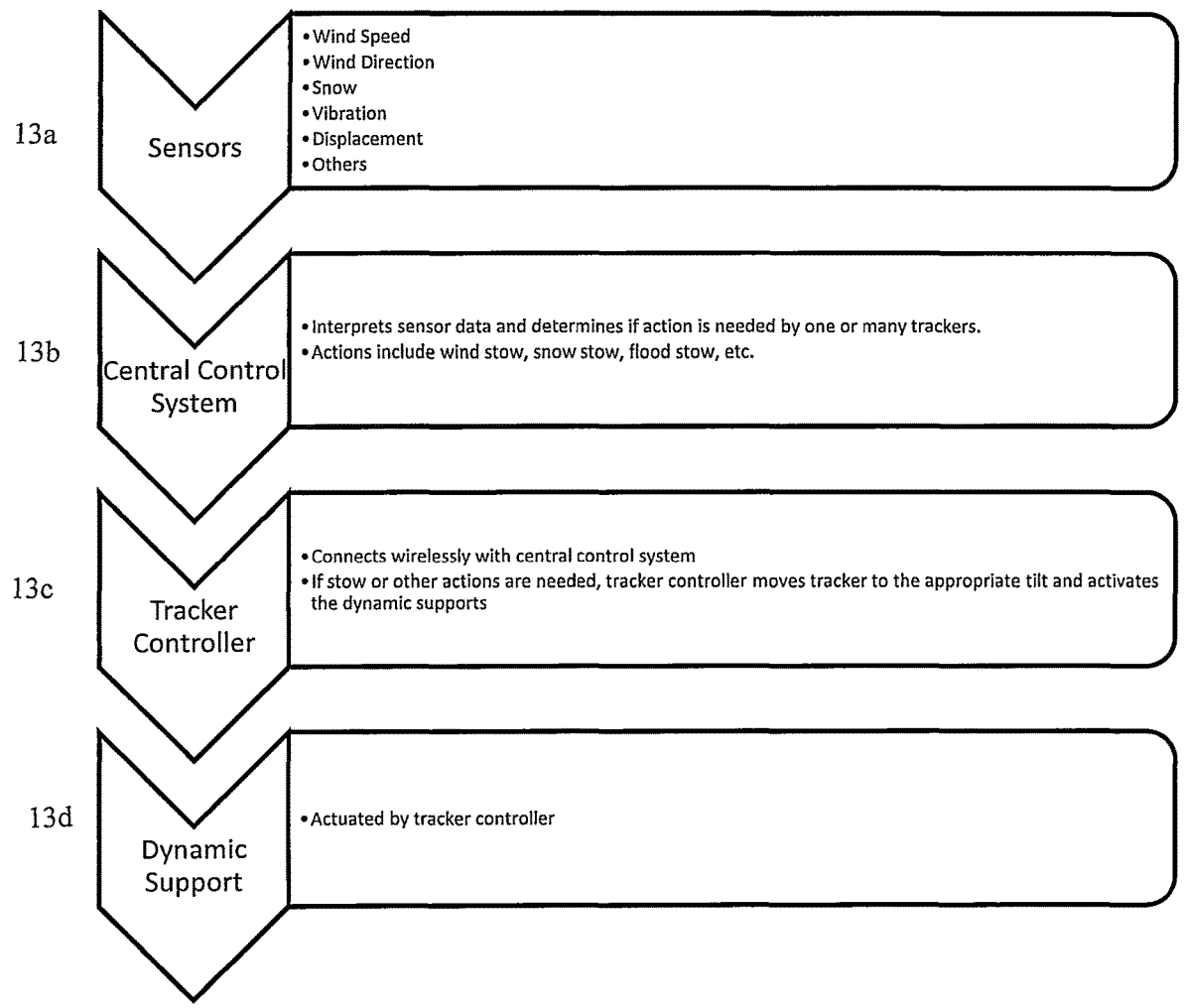
FIG. 13 is a flow diagram of an embodiment of a control system according to one aspect of the present invention.

FIG. 13 is a flow diagram illustrating possible data flow through a control system, according to one aspect of the present invention. In particular, on or more environmental sensors (13a), which detect wind speed, wind direction, snow, vibration, and/or displacement, etc., detect an environmental load condition and provides one or more signals to a central controller. The central controller (13b) receives and interprets the signal data, and determines if any action is required by one or more of the trackers, based on the current environmental conditions.

A tracker controller (13c) may communicate with the central controller either by wired or wireless communications. If a "stow" or other action is required, the tracker controller moves the tracker to the appropriate tilt and activates the dynamic supports. The dynamic support (13d) is then set according to the signal received from the tracker controller. Thus, the solar tracker can be configured to resist any impinging environmental forces that have been detected.

The advantages of the present invention include, without limitation, that a solar tracker which incorporates the present invention may be more cost-effective. Using the present invention allows forces to be resisted in an arbitrary number of points in the solar array, while reducing the requirements and ultimately the delivered cost of many of the components of the solar array, including, but not limited to, the actuators, linkages, and torque tubes. The increased stiffness and natural frequency of the structure mitigates the potential for damaging dynamic responses. In addition, the invention may be used to increase the structural capacity of the structure.

Those skilled in the art will appreciate that various adaptations and modifications of the just described preferred embodiments can be configured without departing from the scope and spirit of the invention. Therefore, it is to be understood that, within the scope of the appended claims, the invention may be practiced other than as specifically described herein.

What is claimed is:

1. A dynamic stabilizer for a solar tracker system, the dynamic stabilizer comprising:
    a damper having a damper shaft, an actuator including a linear actuator, a locking damper pin wherein the locking damper pin is connected to the linear actuator and passed through the damper shaft, and a valve configured to regulate a flow of oil through the damper, wherein the linear actuator and the locking damper pin have a first, depressed position in which the valve is open and the damper is unlocked, and the linear actuator and the locking damper pin have a second, released position in which the valve closes and the damper is locked.

2. The dynamic stabilizer of claim 1, wherein the actuator comprises a mechanical guidewire.

3. The dynamic stabilizer of claim 1, wherein the actuator comprises a push-pull rod.

4. The dynamic stabilizer of claim 1, wherein the actuator comprises a remote activated linear actuator.

5. A solar tracker system comprising:
    a plurality of foundation supports;
    a dynamic stabilizer attached to at least one of the plurality of foundation supports, wherein the dynamic stabilizer comprises:
    a damper comprising a valve and damper shaft, an actuator including a linear actuator, and a locking damper pin connected to the linear actuator and passing through the damper shaft, wherein the linear actuator and the locking damper pin have a first, depressed position in which the valve is open and the damper is unlocked, and the linear actuator and the locking damper pin have a second, released position in which the valve closes and the damper is locked, wherein the valve regulates a flow of oil through damper;

a plurality of solar panels rotatably attached to the plurality of the foundation supports and to the dynamic stabilizer;

at least one environmental sensor;

a control system configured to receive a signal from the at least one environmental sensor; and a tracker controller configured to receive an output signal from the control system;

wherein the tracker controller is configured to output a signal to the dynamic stabilizer to lock or unlock the dynamic stabilizer, based on the signal from the at least one environmental sensor.

6. The solar tracker system of claim 5, wherein the actuator is a remote activated linear actuator.

7. The solar tracker system of claim 5, wherein the at least one environmental sensor monitors one or more of wind speed, wind direction, snow, vibration and displacement.

8. The dynamic stabilizer of claim 1 that further comprises multiple modes of actuation between the locked position and the open position.

9. The dynamic stabilizer of claim 5 that further comprises multiple modes of actuation between the locked position and the open position.

10. The dynamic stabilizer of claim 1 that further comprises a rod end attached to the damper.

11. The dynamic stabilizer of claim 10, wherein the rod end is configured to depress the damper locking pin.

12. The dynamic stabilizer of claim 1, wherein the actuator further comprises a limit switch.

13. The dynamic stabilizer of claim 1, wherein rod end is attached to the damper and to an enclosure.

14. The dynamic stabilizer of claim 12, wherein the damper locking pin depresses the limit switch when the damper locking pin is in a first, depressed position, and the limit switch is configured to communicate with an electronic control system to inform the electronic control that the solar tracker system is unlocked.

15. The solar tracker system of claim 5 that further comprises a rod end attached to the damper.

16. The solar tracker system of claim 15, wherein the rod end is configured to depress the damper locking pin.

17. The solar tracker system of claim 5, wherein the actuator further comprises a limit switch.

18. The dynamic stabilizer of claim 5, wherein rod end is attached to the damper and to an enclosure.

19. The solar tracker system of claim 17, wherein the damper locking pin depresses the limit switch when the damper locking pin is in a first, depressed position, and the limit switch is configured to communicate with an electronic control system to inform the electronic control that the solar tracker system is unlocked.

20. The dynamic stabilizer of claim 1, wherein the first, depressed position of the linear actuator and the damper locking pin is below the second, released position of the linear actuator and the damper locking pin.

21. The solar tracker system of claim 5, wherein the first, depressed position of the linear actuator and the damper locking pin is below the second, released position of the linear actuator and the damper locking pin.

* * * * *